United States Patent
Tsurkan et al.

(10) Patent No.: US 12,553,025 B2
(45) Date of Patent: Feb. 17, 2026

(54) POLYMER-BASED MATERIAL HAVING COVALENTLY BONDED ENZYMATICALLY DEGRADABLE PEPTIDE SEQUENCES

(71) Applicant: LEIBNIZ-INSTITUT FÜR POLYMERFORSCHUNG DRESDEN E. V., Dresden (DE)

(72) Inventors: Mikhail Tsurkan, Dresden (DE); Juliane Teichmann, Dresden (DE); Carsten Werner, Dresden (DE)

(73) Assignee: Leibniz-Institut für Polymerforschung Dresden E.V., Dresden (DE)

( * ) Notice: Subject to any disclaimer, the term of this patent is extended or adjusted under 35 U.S.C. 154(b) by 0 days.

(21) Appl. No.: 16/090,965

(22) PCT Filed: Apr. 4, 2017

(86) PCT No.: PCT/DE2017/100260
§ 371 (c)(1),
(2) Date: Oct. 3, 2018

(87) PCT Pub. No.: WO2017/174071
PCT Pub. Date: Oct. 12, 2017

(65) Prior Publication Data
US 2019/0040353 A1    Feb. 7, 2019

(30) Foreign Application Priority Data
Apr. 4, 2016    (EP) .................... 16163667

(51) Int. Cl.
| | |
|---|---|
| *C12N 5/00* | (2006.01) |
| *C07K 7/06* | (2006.01) |
| *C07K 14/435* | (2006.01) |
| *C12N 9/64* | (2006.01) |

(52) U.S. Cl.
CPC ............. *C12N 5/0068* (2013.01); *C07K 7/06* (2013.01); *C07K 14/435* (2013.01); *C12N 9/6421* (2013.01); *C12N 2533/30* (2013.01); *C12N 2533/50* (2013.01); *C12N 2537/10* (2013.01)

(58) Field of Classification Search
None
See application file for complete search history.

(56) References Cited

U.S. PATENT DOCUMENTS

| | | |
|---|---|---|
| 2003/0012734 A1 | 1/2003 | Pathak et al. |
| 2012/0208266 A1 | 8/2012 | Bookbinder et al. |

FOREIGN PATENT DOCUMENTS

| | | |
|---|---|---|
| EP | 2 511 289 A1 | 10/2012 |
| WO | WO 02/50242 A2 | 6/2002 |
| WO | WO 2013/071126 A1 | 5/2013 |
| WO | WO 2014/039245 A1 | 3/2014 |
| WO | WO2014-098603 * | 6/2014 |
| WO | WO 2014/098603 A1 | 6/2014 |

OTHER PUBLICATIONS

Julien et al. ("Caspases and their substrates" Cell Death and Differentiation, 2017, 24, 1380-1389).*
Gallwitz et al. ("The Extended Cleavage Specificity of Human Thrombin" PLoS Onr; 2012; 7(2): e31756).*
Waugh (The Macromolecular Crystallography Laboratory, Protein Engineering Section; <https://mcl1.ncifcrf.gov/waugh_tech/faq/tev.pdf> Sep. 2010).*
Maitz et al. ("Bio-responsive polymer hydrogels homeostatically regulate blood coagulation" Nature Communications 4:2168; p. 1-6).*
Oishi et al. (Stimuli-Responsive PEGylated nanogels for smart medicine Biomedical Applications of Hydrogels Handbook, 2010).*
Soni et al. ("Nanogels: an overview of properties, biomedical applications and obstacles to clinical translation" J. Control Release 2016; 240: 109-126).*
Kharkar et al. (Thiol-ene Click Hydrogels for Therapeutic Delivery; Prathamesh M. Kharkar, Matthew S. Rehmann, Kelsi M. Skeens, Emanual Maverakis, and April M. Kloxin ACS Biomaterials Science & Engineering Feb. 2016 2 (2), 165-179).*
Kyle et al. (Production of self-assembling biomaterials for tissue engineering Trends in biotechnology vol. 27, issue 7, Jul. 2009, pp. 423-433).*
International Search Report issued by the European Patent Office in International Application PCT/DE2017/100260.
Mikhail V. Tsurkan et al.: "Defined Polymer-Peptide Conjugates to Form Cell-Instructive starPEG-Heparin Matrices In Situ", Advanced Materials, vol. 25, No. 18, May 14, 2013, pp. 2606-2610.
Monika Valtink et al.: "Two Clonal Cell Lines of Immortalized Human Corneal Endothelial Cells Show either Differentiated or Precursor Cell Characteristics", Cell Tissues Organ, 187, pp. 286-294.
J. a. Yang, et al.: "In situ-forming injectable hydrogels for regenerative medicien", *Prog. Polym. Sci.* 2014, 39, 1973.
M. V. Tsurkan et al.: "Modular StarPEG-Heparin Gels with Bifunctional Peptide Linkers",*Macromol Rapid Commun,* 2010, 31, 1529.

(Continued)

*Primary Examiner* — Sudhakar Katakam
*Assistant Examiner* — Tara L Martinez
(74) *Attorney, Agent, or Firm* — Ursula B. Day, Esq.

(57) ABSTRACT

A polymer-based material having covalently bonded enzymatically degradable peptide sequences not degradable by the biological and metabolic activity of cells and tissues is disclosed, wherein the peptide sequences are incorporated into the polymer-based material or conjugated to the polymer-based material. The peptide sequence can be part of the three-dimensional or two-dimensional structure of the polymer-based material. A controlled degradation of a covalent bond in the peptide sequence is effected. Use of such polymer-based material for an in vitro production of cell cultures or tissues or organs, for an in vivo stabilization of donated cells, tissues or organs is also disclosed. An adhesive bond between the material and the sample, i.e. cells, tissues, or organs is controlledly degradable without destroying the integrity of the sample.

3 Claims, 15 Drawing Sheets

Specification includes a Sequence Listing.

(56) References Cited

OTHER PUBLICATIONS

M. V Tsurkan et al.: "Growth factor delivery from hydrogel particle aggregates to promote tubular regeneration after acute kidney injury", *J. Control. Release* 2013, 167, 248.

M. V. Tsurkan et al.: "Enzymatically degradable heparin-polyethylene glycol gels with controlled mechanical properties", *Chem. Commun. (Camb)*, 2010, 46, 1141.

R. Wieduwild et al: "Minimal Peptide Motif for Non-covalent Peptide-Heparin Hydrogels", *J. Am. Chem. Soc.* 2013, 135, 2919.

M. S. Thompson et al.: "Self-Assemblinh Hydrogels Crosslinked Solely by Receptor-Ligand Interactions: Tunability, Rationaliztion of Physical Properties, and 3D Cell Culture", *Chem.—A Eur. J.* 2015, 21, 3178.

K. Chwalek et al.: Gycosaminoglycan-based hydrogels to modualte heterocellular communication in in vitro angiogensis, *Sci. Rep.* 2014, 4, 4414.

K. Chwalek et al.: "Two-tier hydrogel degradation to bosst endothelial cell morphogenesis" *Biomaterials* 2011, 32, 9649.

S. T. Koshy et al.: "Injectable, porous, and cell-responsive gelatin cryogels" *Biomaterials* 2014, 35, 2477.

K. B. Fonseca et al.: "Injectable MMP-sensitive alginate hydrogels as hMSC delivery Systems", *Biomacromolecules* 2014, 15, 380.

G. D. Nicodemus, S. J. Bryant: "Cell Encapsulation in Biodegradable Hydrogels for Tissue Engineering Applications", *Tissue Eng. Part B. Rev.* 2008, 14, 149.

H. E. Canavan et al.L: "Cell sheet detachment affects the extracellular matrix: A surface science study comparing thermal liftoff, enymatic, and mechanical methods", *J. Biomed. Mater. Res.—Part A* 2005, 75. 1.

J. Teichmann, et al.: "Tissue Engineering of the Corneal Endothelium: A Review of Carrier Materials", *J. Funct. Blomater.* 2013, 4, 178.

M. Yamato et al,: "Temperature-responsive cell culture surgaces for regenerative medicine with cell sheet engineering", *Prog. Polym. Sci.* 2007, 32, 1123.

T. Yoshida et al.: "Newly Designed Hydrogel with Both Sensitive Thermoresponse and Biodegradability", *J. Polym. Sci. Part A Polym. Chem.* 2003, 41, 779.

R. Ravichandran et al.: "Advances in Polymeric Systems for Tissue Engineering and Biomedical Applications", *Macromol. Biosci.* 2012, 12, 286.

E. L. Lee, H. a. Von Recum"Cell culture platform with mechanical conditioning and nondamaging cellular detachment", *J. Biomed. Mater, Res.—Part A* 2010, 93, 411.

Y. Haraguch et al.: "Fabrication of functional three-dimensional tissues by stacking cell sheets in vitro", *Nat. Protoc.* 2012, 7, 850.

M. a. Cooperstein, H. E. Canavan: "Biological Cell Detachment from Poly(N-isopropyl acrylamide) and Its Applications", *Langmuir* 2010, 26, 7695.

T. Owaki: "Cell sheet engineering for regenerative medicine: Current challenges and strategies", *Biotechnol. J.* 2014, 9, 904.

N. Matsuda et al.: "Tissue Engineering Based on Cell Sheet Technology", *Adv. Mater.* 2007, 19, 3089.

M. V. Tsurkan et al.: "Photopatterning of Multifunctional Hydrogels to Direct Adult Neural Precurso Cells", *Adv. Healthc. Mater.* 2015, 4, 516.

P. Klán et al.: "Photoremovable Protecting Groups in Chemistry and Biology: Reaction Mechanisms and Efficacy", *Chem. Rev.* 2013, 113, 119.

C. A. DeForest, K. S. Anseth: "Cytocompatible click-based hydrogels with dynamically tunable properties through orthogonal photoconjugation and photocleavage reactions", *Nat. Chem.* 2011, 3, 925.

C. A. DeForest, K. S. Anseth: "Photoreversible Patterning of Biomolecules within Click-Based Hydrogels", *Angew. Chem. Int. Ed. Engl.* 2012, 51, 1816.

C. A. DeForest, K. S. Anseth: "Advances In Bioactive Hydrogels to Probe and Direct Cell Fate", *Annu. Rev. Chem. Biomol. Eng.* 2012, 3, 421.

A. M. Kloxin et al.: "Photodegradable Hydrogels for Dynamic Tuning of Physical and Chemical Properties", *Science* 2009, 324, 59.

J. Arnau et al.: "Current strategies for the use of affinity tags", *Protein Expr. Purif.* 2006, 48, 1.

K. Terpe "Overview of tag protein fusions", *Appl. Microbiol. Biotechnol.* 2003, 60, 523.

D. Esposito, D. K. Chatterjee: "Enhancement of soluble protein expression through the use of fusion tags", *Curr. Opin. Biotechnol.* 2006, 17, 353.

X. Zhao, G. Li, S. Liang: "Several Affinity Tags Commonly Used in Chromotographic Purification", *J. Anal. Methods Chem.* 2013, 2013, DOI 10.1155/2013/581093.

R. J. Jenny et al.: "A critical review of the methods for cleavage of fusion proteings with thrombin and factor Xa", *Protein Expr. Purif.* 2003, 31, 1.

H. Bouchard et al.: "Antibody-drug conjugates—A new wave of cancer drugs", *Bioorg. Med. Chem. Lett.* 2014, 24, 5357.

G. Casi, D. Neri: "Antibody-drug conjugates: Basic concepts, examples and future perspectives", *J. Control. Release* 2012, 161, 422.

S. Chen, Y. Cao: "Assembly of Antibody-Drug Conjugates as Potent Immunotherapy", 2014, 2, 1.

U. Iyer, V. J. Kadambi:"Antibody drug conjugates—Trojan horses in the war on cancer", *J. Pharmacol. Toxicol. Methods* 2011, 64, 207.

H. L. Perez et al.: "Antibody-drug conjugates: current status and future directions", *Drug Discov. Today* 2014, 19, 869.

P. Trail: "Antibody Drug Conjugates as Cancer Therapies", *Antibodies* 2013, 2, 113.

J. A. Yang, et al.: "In situ-forming injectable hydrogels for regenerative medicine", *Prog. Polym. Sci.* 2014, 39, 1973-1986.

M. V. Tsurkan et al.: "Modular StarPEG-Heparin Gels with Bifunctional Peptide Linkers", *Macromol. Rapid Commun.* 2010, 31, 1529-1533.

M. V Tsurkan et al.: "Growth factor delivery from hydrogel particle aggregates to promote tubular regeneration after acute kidney injury", *Journal. of Controlled Release* 2013, 167, 248-255.

M. V. Tsurkan et al.: "Enzymatically degradable heparin-polyethylene glycol gels with controlled mechanical properties", *Chem. Commun.* (Camb): 2010, 46, 1141-1143.

R. Wieduwild et al.: "Minimal Peptide Motif for Non-covalent Peptide-Heparin Hydrogels", *Journal of the American Chemical Society.* 2013, 135, 2919.

M. S. Thompson et al.: "Self-Assembling Hydrogels Crosslinked Solely by Receptor-Ligand Interactions: Tunability, Rationaliztion of Physical Properties, and 3D Cell Culture", *Chem.—A Eur. Journal* 2015, 21, 3178, 1-6.

K. Chwalek et al.: Gycosaminoglycan-based hydrogels to modulate heterocellular communication in in vitro angiogenesis models, *Sci. Rep.* 2014, 4, 4414.1-8.

K. Chwalek et al.: "Two-tier hydrogel degradation to boost endothelial cell morphogenesis" *Biomaterials* 2011, 32, 9649-9657.

S. T. Koshy et al.: "Injectable, porous, and cell-responsive gelatin cryogels" *Biomaterials* 2014, 35, 2477-2487.

K. B. Fonseca et al.: "Injectable MMP-sensitive alginate hydrogels as hMSC delivery systems", *Biomacromolecules* 2014, 15, 380-390.

G. D. Nicodemus, S. J. Bryant: "Cell Encapsulation in Biodegradable Hydrogels for Tissue Engineering Applications", *Tissue Eng. Part B. Rev.* 2008, 14, 149-166.

H. E. Canavan et al.: "Cell sheet detachment affects the extracellular matrix: A surface science study comparing thermal liftoff, enzymatic, and mechanical methods", *J. Biomed. Mater. Res.—Part A* 2005, 75, 1-13.

J. Teichmann, et al.: "Tissue Engineering of the Corneal Endothelium: A Review of Carrier Materials", *J. Funct. Biomater.* 2013, 4, 178208.

M. Yamato et al.: "Temperature-responsive cell culture surfaces for regenerative medicine with cell sheet engineering", *Prog, Polym. Sci.* 2007, 32, 1123-1133.

T. Yoshida et al.: "Newly Designed Hydrogel with Both Sensitive Thermoresponse and Biodegradability", *J. Polym. Sci. Part A Polym. Chem.* 2003, 41, 779-787.

(56) References Cited

OTHER PUBLICATIONS

R. Ravichandran et al.: "Advances in Polymeric Systems for Tissue Engineering and Biomedical Applications", *Macromol. Blosci.* 2012, 12, 28-311.

E. L. Lee, H. a. Von Recum": Cell culture platform with mechanical conditioning and nondamaging cellular detachment", *J. Biomed. Mater. Res.*—Part A 2010, 93, 411-420.

Y. Haraguch et al.: "Fabrication of functional three-dimensional tissues by stacking cell sheets in vitro", *Nat. Protoc*, 2012, 7, 850-85-106.

M. Egami et al.: "Latest status of the clinical and industrical applications of cell sheet engineering and regenerative medicine", *Arch. Pharm. Res.* 2014, 37, 96.

M. A. Cooperstein, H. E. Canavan: "Biological Cell Detachment from Poly(N-isopropyl acrylamide) and Its Applications", *Langmuir* 2010, 26, 7695-7707.

T. Owaki et al.: "Cell sheet engineering for regenerative medicine: Current challenges and strategies", *Biotechnol. Journal.* 2014, 9, 1-11.

N. Matsuda et al.: "Tissue Engineering Based on Cell Sheet Technology", *Adv. Mater.* 2007, 19, 3089-3099.

J. Kobayashi, T. Okano: "Fabrication of a thermoresponsive cell culture dish: a key technology for cell sheet tissue engineering", *Sci. Technol. Adv. Mater.* 2010, 11, 014111.

M. V. Tsurkan et al.: "Photopatterning of Multifunctional Hydrogels to Direct Adult Neural Precurso Cells", *Adv. Healthc. Mater.* 2015, 4, 516-521.

P. Klán et al.: "Photoremovable Protecting Groups in Chemistry and Biology: Reaction Mechanisms and Efficacy", *Chem. Rev.* 2013, 113, 119-191.

C. A. DeForest, K. S. Anseth: "Cytocompatible click-based hydrogels with dynamically tunable properties through orthogonal photoconjugation and photocleavage reactions", *Nat. Chem.* 2011, 3, 925-931.

C. A. DeForest, K. S. Anseth: "Photoreversible Patterning of Biomolecules within Click-Based Hydrogels", *Angew. Chem. Int. Ed. Engl.* 2012, 51, 1816-1819.

C. A. DeForest, K. S. Anseth: "Advances in Bioactive Hydrogels to Probe and Direct Cell Fate", *Annu. Rev. Chern. Biomol. Eng.* 2012, 3, 421-444.

A. M. Kloxin et al.: "Photodegradable Hydrogels for Dynamic Tuning of Physical and Chemical Properties", *Science* 2009, 324, 59-63.

J. Arnau et al.: "Current strategies for the use of affinity tags and tag removal for the purification of recombinant proteins", *Protein Expr. Purif.* 2006, 48, 1-13.

K. Terpe "Overview of tag protein fusions: from molecular and biochemical fundamentals to commercial systems", *Appl. Microbiol. Biotechnol.* 2003, 60, 523-533.

D. S. Waugh "An Overview of Enzymatic Reagents for the Removal of Affinity Tags", *Protein Expr. Purif.* 2011, 80, 283.

D. Esposito, D. K. Chatterjee: "Enhancement of soluble protein expression through the use of fusion tags", *Curr. Opin. Biotechnol.* 2006, 17, 353-358.

X. Zhao, G. Li, S. Liang: "Several Affinity Tags Commonly Used in Chromatographic Purification", *J. Anal. Methods Chem.* 2013, 2013, DOI 10.1155/2013/581093, 1-8.

R. J. Jenny et al.: "A critical review of the methods for cleavage of fusion proteins with thrombin and factor Xa", *Protein Expr. Purif.* 2003, 31, 1.

H. Bouchard et al.: "Antibody-drug conjugates—A new wave of cancer drugs", *Bioorg. Med. Chem. Lett.* 2014, 24, 5357-5363.

G. Casi, D. Neri: "Antibody-drug conjugates: Basic concepts, examples and future perspectives", *J. Control. Release* 2012, 161, 422-428.

S. Chen, Y. Cao: "Assembly of Antibody-Drug Conjugates as Potent Immunotherapy", 2014, 2, 1-5.

U. Iyer, V. J. Kadambi:"Antibody drug conjugates—Trojan horses in the war on cancer", *J. Pharmacol. Toxicol. Methods* 2011, 64, 207-212.

H. L. Perez et al.: "Antibody-drug conjugates: current status and future directions", *Drug Discov. Today* 2014, 19, 869-881.

P. Trail: "Antibody Drug Conjugates as Cancer Therapeutics", *Antibodies* 2013, 2, 113-129.

\* cited by examiner

SEQUENCE LISTING

```
<160> NUMBER OF SEQ ID NOS: 11

<210> SEQ ID NO 1
<211> LENGTH: 7
<212> TYPE: PRT
<213> ORGANISM: Artificial Sequence
<220> FEATURE:
<223> OTHER INFORMATION: enzymatically cleavable peptide sequence, Xaa
      can be any naturally occurring amino acid
<220> FEATURE:
<221> NAME/KEY: misc_feature
<222> LOCATION: (7)..(7)
<223> OTHER INFORMATION: Xaa can be any naturally occurring amino acid

<400> SEQUENCE: 1

Glu Asn Leu Tyr Phe Gln Xaa
1               5

<210> SEQ ID NO 2
<211> LENGTH: 7
<212> TYPE: PRT
<213> ORGANISM: Artificial Sequence
<220> FEATURE:
<223> OTHER INFORMATION: enzymatically cleavable peptide sequence

<400> SEQUENCE: 2

Glu Val Leu Phe Gln Gly Pro
1               5

<210> SEQ ID NO 3
<211> LENGTH: 5
<212> TYPE: PRT
<213> ORGANISM: Artificial Sequence
<220> FEATURE:
<223> OTHER INFORMATION: enzymatically cleavable peptide sequence

<400> SEQUENCE: 3

Asp Asp Asp Asp Lys
1               5
```

```
<210> SEQ ID NO 4
<211> LENGTH: 4
<212> TYPE: PRT
<213> ORGANISM: Artificial Sequence
<220> FEATURE:
<223> OTHER INFORMATION: enzymatically cleavable peptide sequence, Xaa
      can be any naturally occurring amino acid
<220> FEATURE:
<221> NAME/KEY: misc_feature
<222> LOCATION: (2)..(3)
<223> OTHER INFORMATION: Xaa can be any naturally occurring amino acid

<400> SEQUENCE: 4

Asp Xaa Xaa Asp
1

<210> SEQ ID NO 5
<211> LENGTH: 9
<212> TYPE: PRT
<213> ORGANISM: Artificial Sequence
<220> FEATURE:
<223> OTHER INFORMATION: enzymatically cleavable peptid sequence, Xaa
      can be any naturally occurring amino acid
<220> FEATURE:
<221> NAME/KEY: misc_feature
<222> LOCATION: (9)..(9)
<223> OTHER INFORMATION: Xaa can be any naturally occurring amino acid

<400> SEQUENCE: 5

Ile Glu Gly Arg Ile Glu Gly Arg Xaa
1               5

<210> SEQ ID NO 6
<211> LENGTH: 8
<212> TYPE: PRT
<213> ORGANISM: Artificial Sequence
<220> FEATURE:
<223> OTHER INFORMATION: enzymatically cleavable peptide sequence

<400> SEQUENCE: 6

Leu Glu Val Leu Phe Gln Gly Pro
1               5

<210> SEQ ID NO 7
<211> LENGTH: 5
<212> TYPE: PRT
<213> ORGANISM: Artificial Sequence
<220> FEATURE:
<223> OTHER INFORMATION: enzymatically cleavable peptide sequence

<400> SEQUENCE: 7

Leu Pro Glu Thr Gly
1               5

<210> SEQ ID NO 8
<211> LENGTH: 10
<212> TYPE: PRT
<213> ORGANISM: Artificial Sequence
<220> FEATURE:
<223> OTHER INFORMATION: enzymatically cleavable peptide sequence, Xaa
      can be any naturally occurring amino acid
<220> FEATURE:
<221> NAME/KEY: misc_feature
<222> LOCATION: (8)..(8)
<223> OTHER INFORMATION: Xaa can be any naturally occurring amino acid

<400> SEQUENCE: 8

Leu Val Pro Arg Gly Ser Phe Xaa Arg Ser
1               5                   10
```

```
<210> SEQ ID NO 9
<211> LENGTH: 7
<212> TYPE: PRT
<213> ORGANISM: Artificial Sequence
<220> FEATURE:
<223> OTHER INFORMATION: enzymatically cleavable peptide sequence

<400> SEQUENCE: 9

Glu Thr Leu Phe Gln Gly Pro
1               5

<210> SEQ ID NO 10
<211> LENGTH: 14
<212> TYPE: PRT
<213> ORGANISM: Artificial Sequence
<220> FEATURE:
<223> OTHER INFORMATION: enzymatically cleavable peptide sequence

<400> SEQUENCE: 10

Cys Trp Gly Gly Gly Ile Glu Gly Arg Met Gly Gly Cys Gly
1               5                   10

<210> SEQ ID NO 11
<211> LENGTH: 14
<212> TYPE: PRT
<213> ORGANISM: Artificial Sequence
<220> FEATURE:
<223> OTHER INFORMATION: enzymatically cleavable peptide sequence

<400> SEQUENCE: 11

Cys Gly Gly Gly Ile Glu Gly Arg Met Gly Gly Trp Cys Gly
1               5                   10
```

POLYMER-BASED MATERIAL HAVING COVALENTLY BONDED ENZYMATICALLY DEGRADABLE PEPTIDE SEQUENCES

CROSS-REFERENCES TO RELATED APPLICATIONS

This application is the U.S. National Stage of International Application No. PCT/DE2017/100260, filed Apr. 4, 2017, which designated the United States and has been published as International Publication No. WO 2017/174071 A1 and which claims the priority of European Patent Application, Serial No. 16163667.5, filed Apr. 14, 2016, pursuant to 35 U.S.C. 119(a)-(d) the description of which is hereby incorporated by reference.

BACKGROUND OF THE INVENTION

The invention relates to a polymer-based material with covalently bonded, enzymatically degradable peptide sequences. The invention further relates to the use of such a polymer-based material for in-vitro production of cell cultures or tissues or organs, for in-vivo stabilization of donated cells, tissues or organs as well as for in-vivo or in-vitro treatment of living cells, tissues and organs. In this case, an adhesive bond between the material on the one hand and the sample on the other hand, meaning cells, tissues or organs, is controlledly degradable, without destroying the integrity of the sample (extracellular matrix as well as cell-cell and extracellular matrix-cell contacts) (bio-orthogonality).

A number of techniques exist for the formation of cell-compatible materials and for their individual functionalization with a variety of biologically active molecules, such as covalently bonded cell-adhesive peptides, proteins, and sometimes growth factors and cytokines. Compared to these methods, synthetic methods for introducing selective material decomposition reactions are essentially unexplored. The enzymatic methods of cell detachment/dissociation used hitherto, such as methods using trypsin, pepsin or collagenases, are not applicable to either newly generated or donated tissues and organs, as these nonselective methods damage the order of their extracellular matrix. In addition, the use of such enzymes for releasing cells in three-dimensional materials is severely limited because it requires a higher enzyme concentration or longer treatment times, which can lead to undesired cleavage of the cell surface proteins. More selective matrix metalloproteases (MMPs) which cleave certain amino acid sequences have been shown to be applicable for a gentle cell collection in three-dimensional hydrogel materials. The most commonly used MMPs have shown little effect on cell behavior. However, the use of MMPs for tissue or organ applications is generally limited, as they cause cleavage of collagen family proteins in the extracellular matrix (ECM), which can result in the loss of important structural units of the tissues and organs. In summary, the current state of the art provides practical techniques for cell retrieval in both two- and three-dimensional applications, whereas, to date, there are no suitable biotechnological methods available for the gentle recovery of complex cell entities, such as tissues and organs, from carrier materials.

In addition to classical enzymatic methods, some future techniques for cell-removal based on influencing the physicochemical properties of the materials are promising. For example, some progress has been made in the development of thermo-responsive bio-hybrid materials that induce mechanical stress in response to temperature changes. Such stress, for example swelling of a hydrogel structure, induces detachment (delamination) of adherent cells, and has therefore been used for the preparation of single-layer cell layers, known as cell-sheet engineering. Nevertheless, this method requires balancing cell adhesion and induced detachment and producing user-defined carrier properties in order to be useful for various cell types. Without such time- and resource-intensive generation/adaptation, the material-induced stress can damage the cellular ECM attached to the materials, thereby limiting the reproducibility of such processes.

Moreover, this prior art is limited to simple two-dimensional applications and the suitability of the temperature-sensitive carriers for multilayer or more complex tissues is questionable. Such a limitation of the applicability becomes more severe when organs are transported or treated: Thermoresponsive carriers can then no longer be used, since they do not provide sufficiently strong adhesion (the polymer layers are only a few hundred nanometers thick). Another disadvantage of the thermoresponsive carriers is the temperature change required for delamination: there are cells that are very sensitive and do not survive long-term temperature changes/temperature drops without damage.

More recently, the growing interest in orthogonal methods in materials chemistry has led to the generation of hydrogels which can be orthogonally cleaved by light and cells. The use of two-photon techniques enables the use of such methods for light-controlled cell migration/cleavage from hydrogel frameworks. With some adjustments, such systems could be used for cell harvesting; however, the current limitation to two-photon devices and the low biocompatibility of the corresponding photon reactions limit this promising technique to single cell applications.

In summary, the most advanced physical chemistry methods currently available for influencing materials do not have the necessary instrumentation for the gentle cell cleavage of complex cell assemblies, such as tissues and organs, from carrier materials.

The development of compatible materials for de-novo tissue generation, tissue engineering, or for stabilizing donated tissues or organ implants is a general approach in the fields of regenerative medicine and implant research. Advances in these areas of research have led to today's understanding of the importance of self-regeneration methods in which ex-vivo tissues or organs can be regenerated from a small number of original cells. These methods introduce in the material development for tissue and organ implant fabrication several new problems-some of them self-exclusion problems. On the one hand, cell cultures require stable biofunctionalized surfaces or scaffolds which are similar to the three-dimensional extracellular matrix and which can be degraded for the expansion of the cells and the subsequent tissue production by the cell. Strong cell-adhesive properties of such materials are an important feature for a successful cell or tissue development. On the other hand, for a successful implantation, the formed tissue should be gently separated from the carrier material in order to maintain its cellular and extracellular matrix structure untouched. In other words, the adhesion between tissue and material should be reduced without destroying the extracellular matrix as well as the cell-cell and extracellular matrix-cell bonds within the tissue. However, since these bonds are of the identical or similar chemical nature, their selective cleavage requires novel, non-trivial bio-orthogonal methods for the selective degradation of the adhesive bond between material and tissue.

It is therefore the object of the invention to provide a material in which an adhesive bond between the material and cells, tissues or organs can be controlledly and selectively degraded, without destroying the bond between the cells and the extracellular matrix within the tissue.

SUMMARY OF THE INVENTION

The object of the invention is attained with a polymer-based material having covalently bonded, enzymatically degradable peptide sequences and at least one site that is enzymatically cleavable by proteases, the at least one site is selected from a group of cleavable sites consisting of a site cleavable by tobacco etch virus protease, a site cleavable by human rhinovirus 3C protease, a site cleavable by factor $X_a$ Protease, a site cleavable by thrombin protease, a site cleavable by enterokinase, a site cleavable by sortase, a cleavable site by caspase-3 protease, a site cleavable by granzyme B serine protease, a site cleavable by a fusion protein of glutathione-S-transferase (GST) and a site cleavable by human rhinovirus (HRV) type 14-3C protease, wherein each of the peptide sequences consists of between 2-15 amino acids incorporated into the polymer-based material or is conjugated to the polymer-based material and acting as linker molecules in a two-dimensional or three-dimensional structure of the polymer-based material, wherein a covalent bond of the peptide sequence is degradable by a controlled enzyme addition, either by bio-orthogonal degradation of the three-dimensional structure, or with the peptide sequence that is conjugated to the polymer-based material, at least a portion of the molecule is released. The degradable, preferably cleavable peptide sequences are hereby inert to the general biological and metabolic activity of cells and tissues, meaning they cannot be degraded by the biological and metabolic activity of cells and tissues. The peptide sequences are each composed of two to fifteen amino acids and can be incorporated into the polymer-based material or conjugated to the polymer-based material. Thus, the peptide sequence may be part of either a three-dimensional or a two-dimensional structure of the polymer-based material. Either a bio-orthogonal degradation of the three-dimensional structure occurs through an enzyme-addition-controlled degradation of a covalent bond of the peptide sequence, or at least a portion of the molecule is released when the peptide sequence is conjugated with the polymer-based material.

Preferably, the number of amino acid residues per peptide molecule is from 5 to 10. The polymer-based material may form a two or three-dimensional networked structure with nodes and edges, wherein at least a portion of the nodes and/or edges have the linking molecules. The polymer-based material may be, for example, a hydrogel or a preferably solid, condensed polymer. According to an advantageous embodiment of the invention, the polymer-based material may be a polymer coating of a carrier substrate (for example glass).

According to a particularly preferred embodiment of the invention, the polymer-based material includes at least a preferably bioactive component which is releasable by a degradation of the covalent bond of the peptide sequence controlled by enzyme addition. This component belongs to a group of components consisting of active ingredients, nucleic acids, for example DNA, RNA or aptamers, proteins, peptide conjugates, sulfated and non-sulfated polysaccharides and their conjugates. The protein or peptide conjugate may advantageously be a cytokine, a chemokine, a growth factor, a hormone, an antibody or a component of the extracellular matrix.

According to one modified embodiment, the molecules of the at least one releasable component are conjugated to the polymer-based material by linkers which each contain the enzymatically degradable peptide sequence.

Alternatively, the molecules of the at least one releasable component may be physically enclosed in and physically bonded to a three-dimensional polymer network. The components would then be released by a bio-orthogonal degradation of the enclosing polymer network.

According to the invention, the peptide sequences are enzymatically degradable by having a site that is enzymatically cleavable by proteases. The release of active ingredients, nucleic acids, proteins, peptide conjugates or polysaccharides can then be controlled via the addition of protease.

In accordance with the invention, the cleavable peptide sequence thereby has a cleavable site selected from a group of cleavage sites consisting of a site cleavable by tobacco-etch-virus-protease, a site cleavable by human rhinovirus 3C protease, a site cleavable by factor $X_a$ protease, a site cleavable by thrombin protease, a site cleavable by enterokinase, a site cleavable by sortase-A-protease, a site cleavable by caspase-3 protease, a site cleavable by granzyme B serine protease as well as a site cleavable by PreScission™. PreScission™ is a fusion protein composed of glutathione S-transferase (GST) and human rhinovirus (HRV)-type 14-3C protease.

Advantageously, these peptide sequences are selected as enzymatically degradable peptide sequences that cannot be degraded by the biological and metabolic activity of cells and tissues. The peptide sequence is preferably selected from a group consisting of ENLYFQ/X (SEQ. ID. NO. 1), ETVLFQ/GP (SEQ. ID. NO. 9), EVLFQ/GP (SEQ. ID. NO. 2), IEGR/IEGRX (SEQ. ID NO. 5), DDDDK/(SEQ. ID NO. 3), LVPRGS/FXRS (SEQ. ID. NO. 8), DXXD/(SEQ. ID. NO. 4), LPET/G (SEQ. ID. NO. 7), wherein the forward slash (/) indicates the respective cleavable site, and the letters represent the single-letter code of the proteinogenic amino acids, and X represents any naturally occurring amino acid.

According to another embodiment of the invention, the polymer-based material further includes peptide sequences which are degradable by the biological and metabolic activity of cells and tissues, and which are incorporated into the polymer-based material or conjugated to the polymer-based material, such that the peptide sequence is part of either a two-dimensional or three-dimensional structure of the polymer-based material. The biological and metabolic activity of cells and tissues results in bio-orthogonal degradation of the three-dimensional structure, or in the case of conjugation of the peptide sequence to the polymer-based material, cause the release of at least a portion of the molecule. These peptide sequences are preferably linked to the peptide sequences which are not degradable by the biological and metabolic activity of cells and tissues. A controlled addition of an enzyme, i.e. an addition of the enzyme as needed, causes an acceleration of the degradation of the material or an accelerated release of components.

The present invention can be used with methods for on-demand, i.e. time-controlled, cleavage of a covalent bond in polymer-based materials, wherein these methods can be performed in the presence of living cells, tissues, or organs in-vitro or in-vivo in a bio-orthogonal manner. These applications/methods are based on the incorporation of the short enzymatic degradable/cleavable peptide sequences into common polymer-based material structures as molecular linkers. The enzymatically controlled degradation of the covalent bond leads to material degradation when the degradable covalent bond is located within the material structure. The enzymatically controlled degradation of the covalent bond causes molecules to be released when the degradable bond is in each case part of molecules that are conjugated to the material. The bonds of the material which can be degraded by the enzymatic reaction enable an orthogonal application of the enzymatic reaction in the presence of living matter, such as cells, tissues or organs, and/or in the presence of molecules of the extracellular matrix.

The polymer-based material provided with the degradable peptide sequence can be used for a controlled in-vivo or in-vitro release of an active ingredient or another one of the releasable bioactive components mentioned above, wherein the release takes place through a controlled degradation of the covalent bond of the peptide sequence by means of enzyme addition. Such application may take place particularly in the context of in-vivo or in-vitro treatment of cells, tissues and organs, wherein, if necessary, an active ingredient and/or another of the aforementioned releasable bioactive components are controlledly released by enzyme addition.

In addition, the inventive polymer-based material is suitable for an in-vitro cell culture and/or in-vitro production of tissue or organs. The enzymatic cleavage of the material does not affect the extracellular matrix or the cell-cell and extracellular matrix-cell contacts. Thus, it enables nondestructive separation of a living sample, i.e., a cell, a cell layer of a tissue or organ and its extracellular matrix, from the carrier material by degrading material as needed at any time of the development of the living sample.

The polymer-based material provided with the degradable peptide sequence may also be used for in-vitro stabilization of donated cells as well as donated tissues or organs. Also in this case, the enzymatic cleavage of the material does not affect the extracellular matrix or cell-cell and extracellular matrix-cell contacts. The controlled enzymatic cleavage of the peptide sequences allows a gentle/non-destructive separation of the cells/tissue/organ from the support material for successful implantation.

In summary, the application of the described enzymatic degradation as a bio-orthogonal method for material degradation opens up completely new perspectives for the biomaterial applications of living cells, tissues, and organs in-vitro or in-vivo.

Further details, features and advantages of embodiments of the invention will become apparent from the following description of exemplary embodiments with reference to the accompanying drawings, which show in:

DETAILED DESCRIPTION OF PREFERRED EMBODIMENTS

Figure 1:
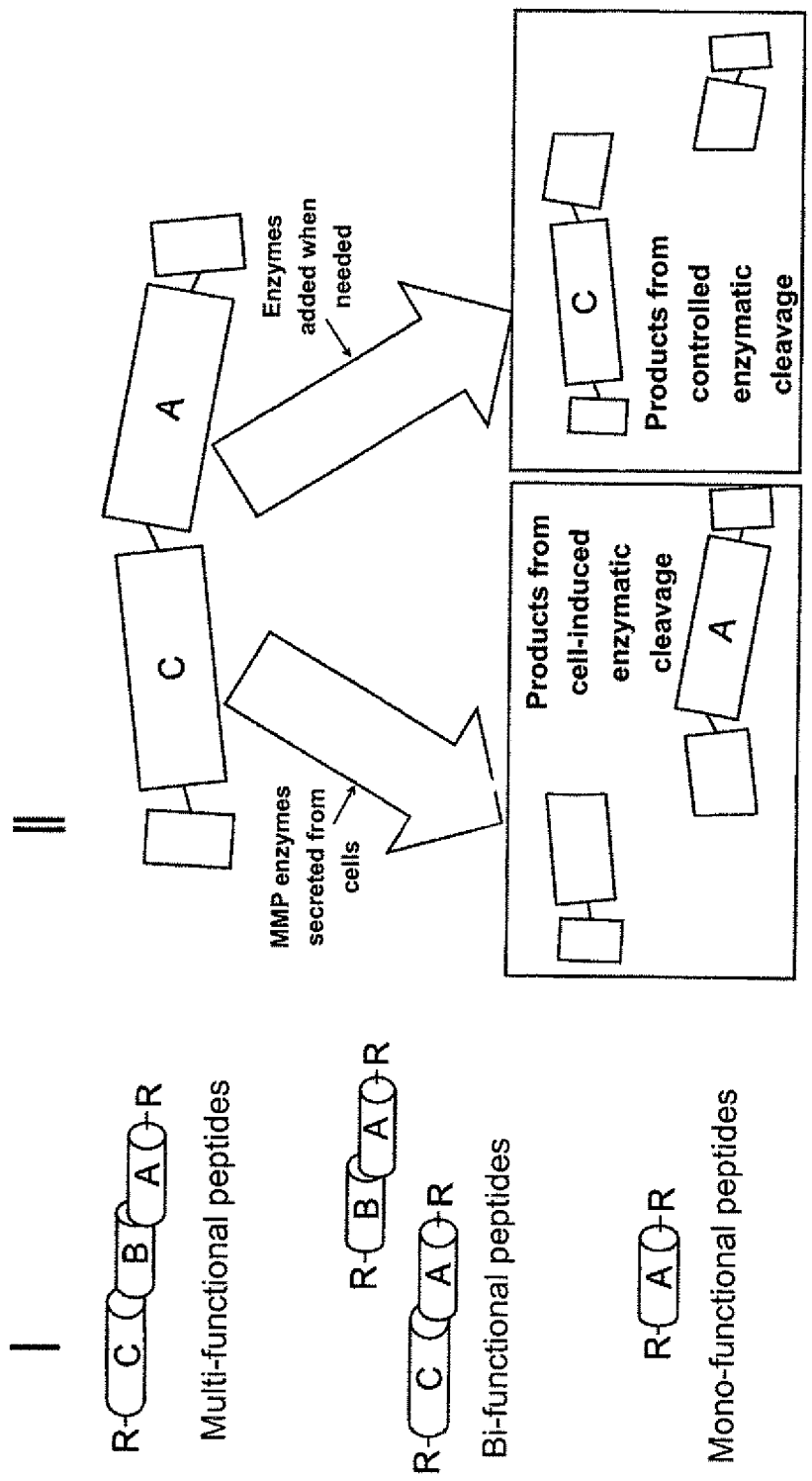
FIG. 1 a schematic diagram of polymer-based material structures with incorporated short enzymatically cleavable peptide sequences as molecular linkers, FIG. 2 examples of possible functional surface coatings with short enzymatically cleavable peptide sequences as molecular linkers, FIG. 3 examples of an enzymatically cleavable peptide linker as well part of a hydrogel or a condensed polymeric material, FIG. 4 the use of active ingredients, which can be bonded to the material via peptide linkers, FIG. 5 a schematic diagram of the use of a bio-orthogonal material degradation for the production of single layers of cell tissues or grafts, FIG. 6 a schematic diagram of the use of bio-orthogonal material degradation for the production of cells and tissues in three-dimensional applications, FIG. 7A a reaction scheme of PEG-peptide conjugate formation.

The present invention relates to a method for on-demand, i.e., time-controlled, cleavage of the covalent bond in polymer-based materials which is performed bio-orthogonally in the presence of living cells, tissues, or organs in-vitro or in-vivo, as schematically illustrated in FIG. 1. This method is based on the incorporation of short enzymatically cleavable peptide sequences as molecular linkers, i.e. linker molecules, into commonly used polymer-based material structures such as hydrogels or condensation polymers.

The diagram I of FIG. 1 shows schematically a multifunctional peptide molecule having the general structure RCBAR, bifunctional peptide molecules having the general structures RBAR and RCAR, and a monofunctional peptide molecule having the general structure RAR, where R is a polymeric residue of the material.

A is here an enzymatically cleavable peptide sequence which can be cleaved by a controlled enzyme addition. Preferably, these enzymes are proteases, as listed in Table 1. As also shown in Table 1, cleavable peptide sequences, which can be cleaved by the corresponding proteases at the cleavage sites (/), are each assigned to the respective proteases.

The listed peptides are examples of peptides that are inert to the general biological and metabolic activity of the living tissue, but can undergo selective enzymatic cleavage by specific enzymes. The enzymes listed in Table 1 can cleave the amino acid sequences with a very high selectivity, but are exclusively inactive against the digestion of both cellular and extracellular matrix proteins.

TABLE 1

| Proteases | |
|---|---|
| Proteases (Abbreviations) | Cleavable peptide sequences with cleavage site (/) |
| Tobacco etch virus protease (TEV) | ENLYFQ/X (SEQ. ID NO. 1) |
| Human rhinovirus 3C-protein (3C) | EVLFQ/GP (SEQ. ID NO. 2) |
| | ETLFQ/GP (SEQ. ID NO. 9) |

TABLE 1-continued

Proteases

| Proteases (Abbreviations) | Cleavable peptide sequences with cleavage site (/) |
|---|---|
| Factor X$_a$ (Xa) | IEGR/IEGRX (SEQ. ID NO. 5) |
| Thr thrombin-protease | LVPRGS/FXRS (SEQ. ID NO. 8) |
| EntK enterokinase | DDDDK/ (SEQ. ID NO. 3) |
| Caspase Caspase-3 | DXXD/ (SEQ. ID NO. 4) |
| PreScission ™ | LEVLFQ/GP (SEQ. ID NO. 6) |
| Sortasis A | LPET/G (SEQ. ID NO. 7) |
| Granzym B serin (high risk for the non-specific cleavage) | DX, NX, MN, SX |

The letter B in the structures of FIG. 1 represents bioactive peptide motifs which are different from the enzymatically cleavable peptide sequences A, for example, a cell-adhesive RGD sequence.

The letter C in the structures of FIG. 1 indicates bioactive peptide motifs which are different from the enzymatically cleavable peptide sequences A, for example a cell-responsive MMP sequence, i.e. a peptide sequence cleavable by matrix metalloprotease.

The diagram II of FIG. 1 shows a Type C module as a cell-responsive MMP sequence and an orthogonal enzymatically cleavable module with a Type A peptide sequence which are joined, on the one hand, to one another and, on the other hand, each with one of two material modules. As shown in diagram II of FIG. 1, MMP enzymes secreted by the cell may cause cleavage of the cell-responsive sequence of module C. As products, the schematic view of diagram II of FIG. 1 shows a cleavage product of the MMP sequence C together with a material module and the non-cleaved peptide sequence A, which is connected, on the one hand, with the second cleavage product of the MMP sequence and, on the other hand, with the second material binding module.

The right side of diagram II in FIG. 1 shows an orthogonal cleavage of the enzymatically cleavable peptide sequence A. Controlled addition of an enzyme, i.e. addition of the enzyme as needed, causes here the orthogonal cleavage of the enzymatically cleavable module A and thus an acceleration the degradation of the material. The produced cleavage product is a component of a peptide motif of the enzymatically cleaved peptide sequence A, which is connected to a material binding module. The second produced cleavage product is a peptide motif of the enzymatically cleaved peptide sequence A, which is bonded to the sequence C, which in turn is connected to a material module.

The enzymatically cleavable peptides A used according to the invention are inert to the general biological and metabolic activity of the living tissue, but can be subjected to enzymatic cleavage by specific enzymes as shown in Table 1. The enzymatic cleavage of the material does not affect the extracellular matrix or the cell-cell and extracellular matrix-cell contacts. Thus, it enables separation of the living sample and its extracellular matrix from the material carrier by degradation of material as needed at any point in the development of the living sample. Also described below are various synthetic routes for the incorporation of a cleavable peptide sequence into common soft and condensed polymer-based materials that enable such incorporation in most materials for biological applications.

Figure 2:
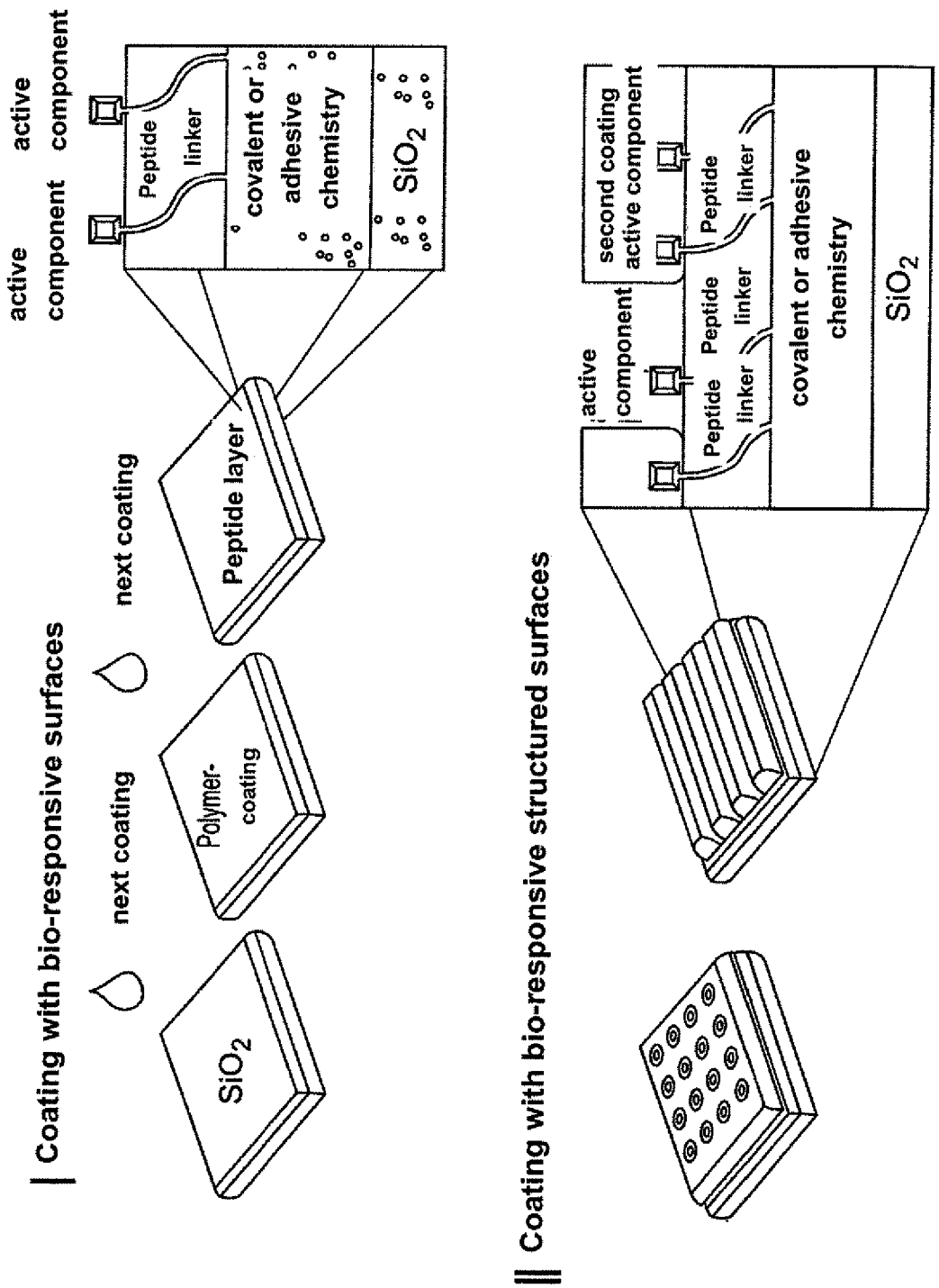

As shown in FIG. 2, a linker having an enzymatically cleavable peptide sequence may be included as part of a coating, with the cleavable peptide sequence allowing the detachment of any object attached to the coating via the linker.

FIG. 2 shows, in diagram I, schematically the coating of an SiO$_2$ base substrate in a known manner, first with one or more functionalized polymer coatings with covalent or adhesive bonding (covalent or adhesive chemistry), which are then coated with peptides. The peptides with the cleavable peptide sequences connect as molecular linkers the functional groups of the polymer layer with an active compound.

As shown in the lower diagram II of FIG. 2, a structured bio-responsive surface can be produced by a second partially coated surface, wherein in a coating only a part of the peptide coating with the active compounds on the surface is uncoated.

Figure 3:
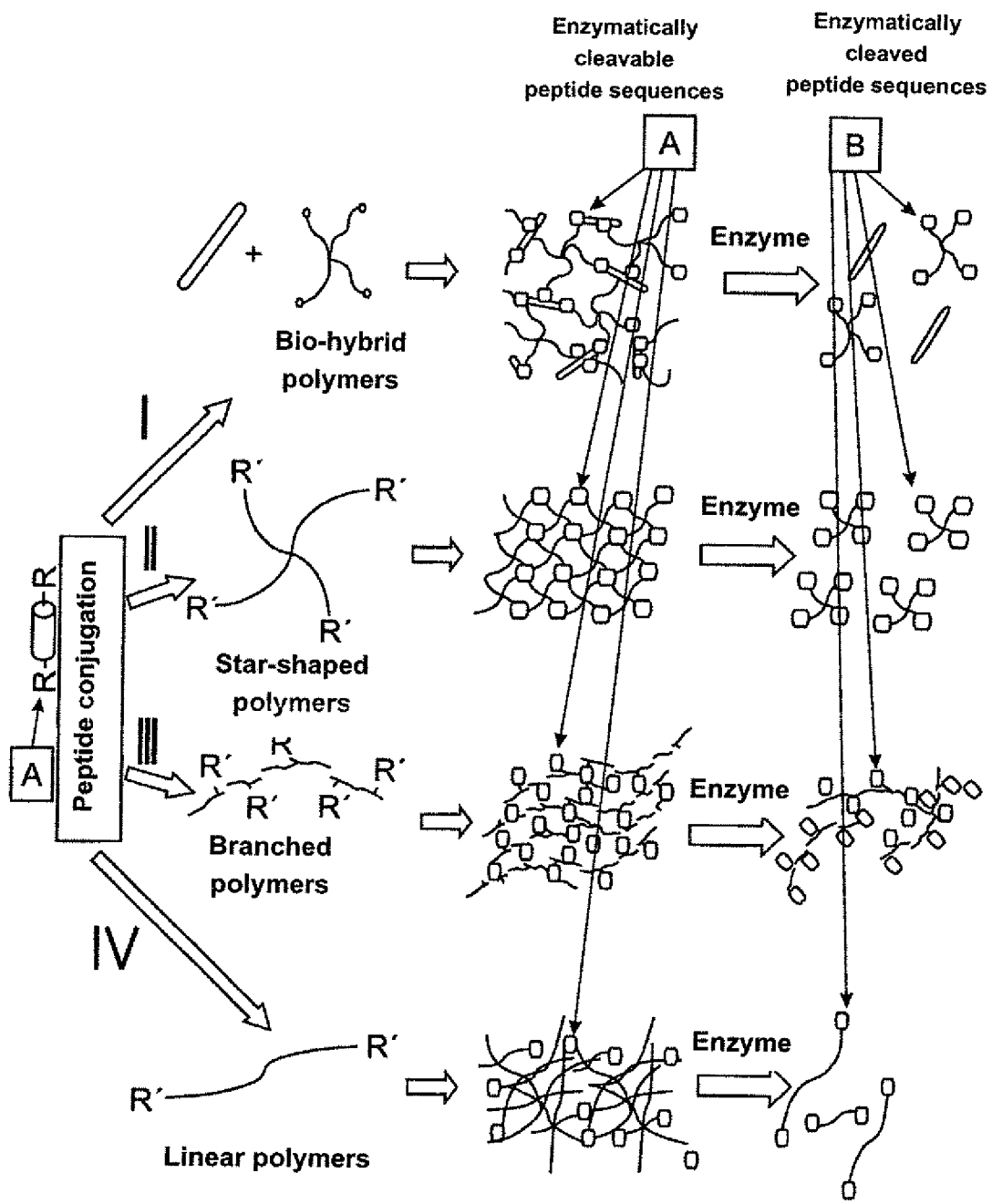

FIG. 3 shows schematically by way of examples I, II, III and IV the incorporation of enzymatically cleavable peptide linkers in a hydrogel or a condensed polymeric material. As shown in the examples in FIG. 3, the enzymatically cleavable linker is part of the hydrogel or the condensed polymeric material, with the cleavable linker permitting controlled degradation of the hydrogel or structure of the condensed polymeric material, if desired. As a result of the degradation, objects that are bonded to the material or enclosed in the material are released.

The example I in FIG. 3 shows schematically the formation of a hydrogel/condensation polymer from biohybrid polymers. Biohybrid polymers can be prepared by coupling non-biological polymers such as polyethylene glycol (PEG) or polyacrylamide with biological components such as saccharides, protein modules and/or DNA elements. Example I shows a star-shaped polymer having at each end a peptide sequence. The covalently linked, enzymatically degradable peptide sequences interconnect the biohybrid polymers by attaching each biological component to multiple peptide sequences located at the ends of the star-shaped polymer molecules. The cleavable peptide sequences are thus part of the hydrogel. The biological components are thus attached to the material or are enclosed in the material. By adding an enzyme and thereby cleaving the peptide sequence from the biological material, the hydrogel material is degraded, releasing the biological component and leaving the peptide sequences on the non-biological molecules.

Example II of FIG. 3 schematically illustrates the production of a polymer-based material in a hydrogel or condensation polymer of star-shaped polymers, for example, star PEG, in which the enzymatically cleavable peptide sequences connect the ends of the plurality of star-shaped polymer molecules into a network structure which forms nodes and edges. Enzyme addition and the resulting cleavage of the peptide sequences can be followed by controlled degradation of the network structure into individual star-shaped polymers, with the residues of the cleaved peptide sequence in the form of peptide motifs arranged at each of the ends.

In Example III of FIG. 3, the enzymatically cleavable peptide sequences are part of a hydrogel/condensation polymer having branched polymers with short side chains, the branched molecules being linked together at the ends of their side chains via the cleavable peptide sequences. With enzyme addition and the resulting cleavage of the peptide sequences, a controlled degradation of the network structure into individual branched polymers with peptide motifs of the cleaved peptide sequences can take place at the ends of the side chains.

In Example IV of FIG. 3, the enzymatically cleavable peptide sequences are part of a hydrogel/condensation polymer with linear polymers wherein the linear molecules at the ends of their side chains are linked together via the cleavable peptide sequences, forming a ball. With enzyme addition and the resulting cleavage of the peptide sequences, a controlled degradation of the ball structure into individual linear polymers can take place, which have at the ends peptide motifs of the cleaved peptide sequences.

Figure 4:
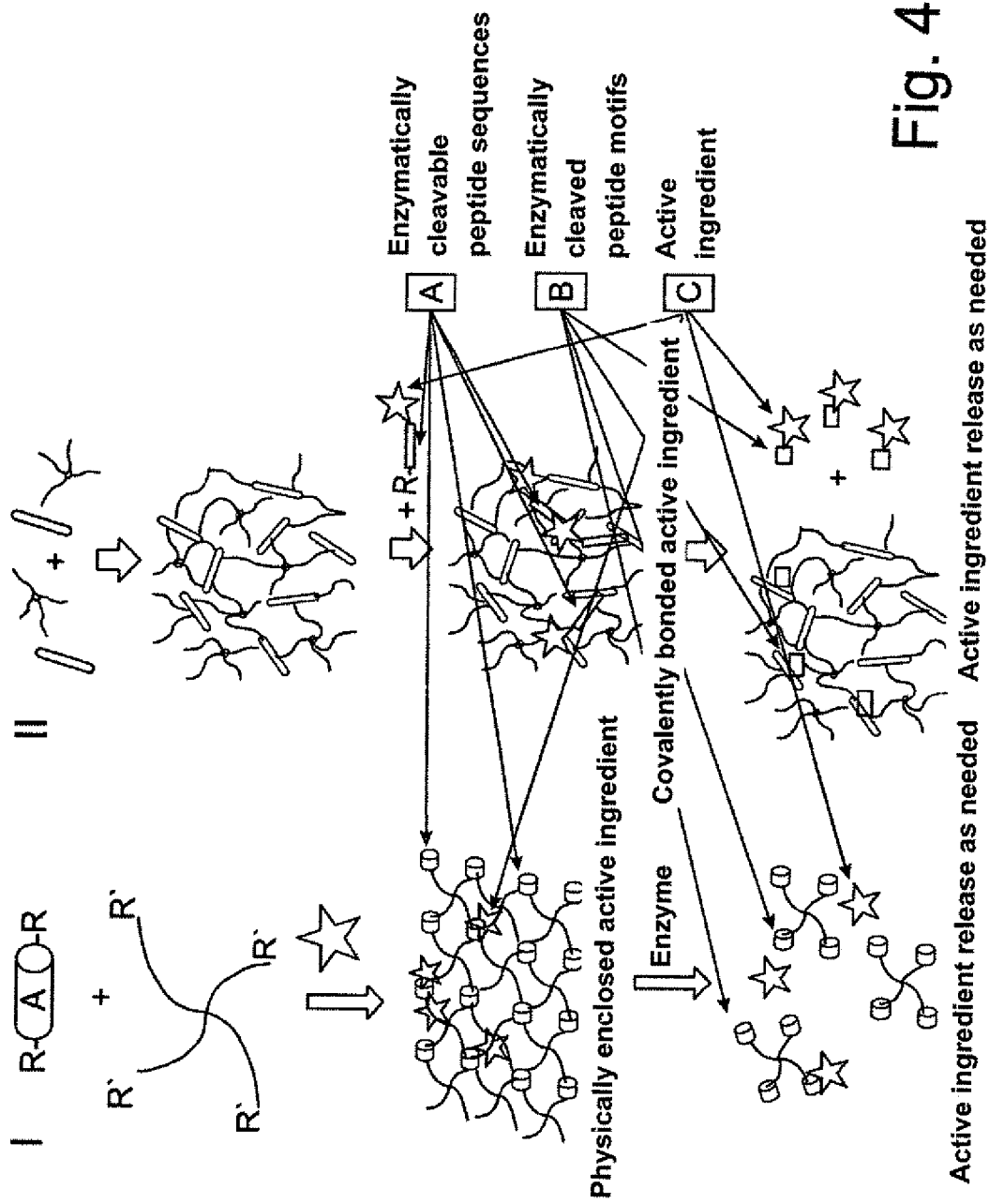

FIG. 4 shows schematically the application of the invention for the release of active ingredients bonded to the material by a molecular linker having a cleavable peptide sequence. This allows a demand-based, time-controlled release of the active ingredient, wherein the active ingredient is attached to the surface of the material or to the material framework as a three-dimensional application.

The diagram I of FIG. 4 shows schematically the production of a polymer-based material in the form of a hydrogel or condensation polymer, wherein the molecules of a star-shaped polymer, for example star-PEG, are connected at the ends of the polymer molecules to a three-dimensional network structure by linker molecules which contain enzyme-cleavable peptide sequences. By adding an active ingredient during generation of the network structure, the molecules of the active ingredient are physically enclosed in the network structure. With enzyme addition and the resulting cleavage of the peptide sequences, a controlled degradation of the network structure into individual star-shaped polymers can then take place, with respective residues of the cleaved peptide sequence then located at the ends of the star-shaped polymers in the form of peptide motifs. As a result of the degradation of the network structure, the active substances previously physically enclosed in the network structure are released.

The diagram II in FIG. 4 shows schematically the formation of a three-dimensional networked material of biohybrid polymers, preferably a hydrogel or a condensation polymer, wherein molecules having an enzymatically cleavable peptide sequence with a covalently attached active ingredient are attached on the surface of the networked material. The addition of the enzyme causes cleavage of the covalent bond, which leads to the release of the molecules of the active ingredients with covalently bonded peptide motifs of the cleaved peptide sequences. In this way, a release of the active ingredient that is controlled by addition of enzymes is possible, whereby the three-dimensional network (hydrogel or condensation polymer) is retained.

Figure 5:
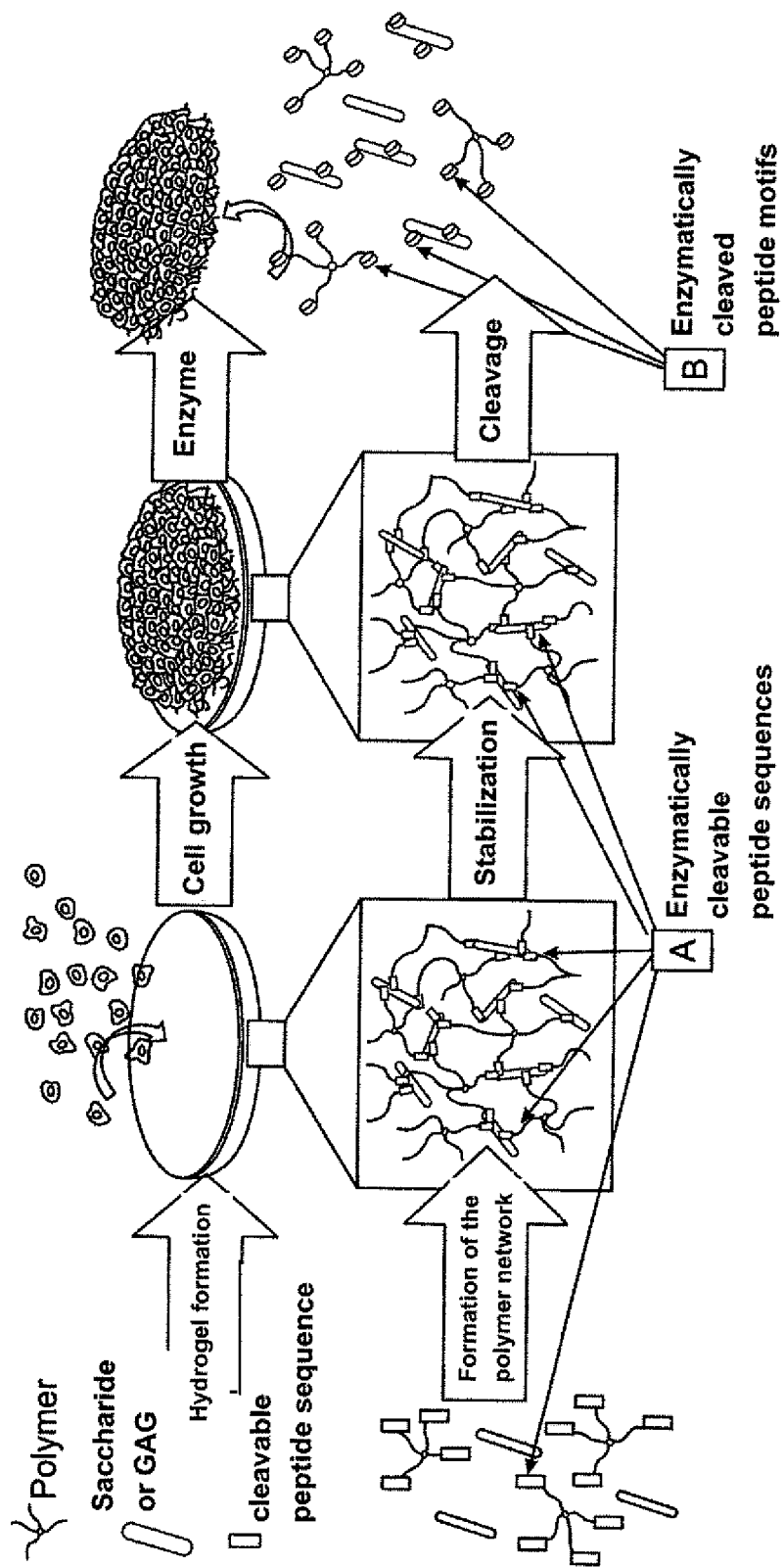

The method of bio-orthogonal material degradation can also be used for the production of single layers of cells and tissues and grafts or in three-dimensional applications (FIG. 5).

FIG. 5 shows a schematic representation of the application of bio-orthogonal material degradation for the preparation of cell tissue single layers or grafts in which the material to be grown is a hydrogel. This hydrogel includes a polymer network which, as shown in FIG. 5, is produced by mixing a star-shaped polymeric component, a second component in the form of a saccharide or a glycosaminoglycan (GAGs) and a cleavable short peptide sequence. Together, these three components form a polymer network with one peptide sequence at each end of the star-shaped polymer. Several peptide sequences that are not linked to the same polymer molecule are connected to each of the saccharide or GAG molecules. In this way, the polymer network for the hydrogel is formed, part of which are the cleavable peptide sequences. The cleavable peptide sequences are, as part of the three-dimensional structure of the polymer-based material, essential for the existence of the structure, so that a partial to complete bio-orthogonal degradation of the structure takes place in the event of cleavage or degradation of the binding of the peptide sequences. Cells are applied to the hydrogel after hydrogel formation, as shown in the upper part of FIG. 5, resulting in cell growth. After the formation of the cell or tissue layer or after the preparation of the graft, the adhesive bond between the polymer-based material and the cell layer/tissue/graft/implant can be degraded by controlled enzyme addition. The enzyme cleaves/degrades a covalent bond of the peptide sequences, resulting in a bio-orthogonal degradation of the three-dimensional material structure. The polymer network decomposes into star-shaped polymer molecules with terminal peptide motifs of the previously cleaved peptide sequence as well as saccharide or GAG molecules, also with attached peptide motifs of the cleaved peptide sequence, whereby the star-shaped polymer and the saccharide or GAG are gently and selectively detached from the cell or tissue layer or the graft/implant.

Figure 6:
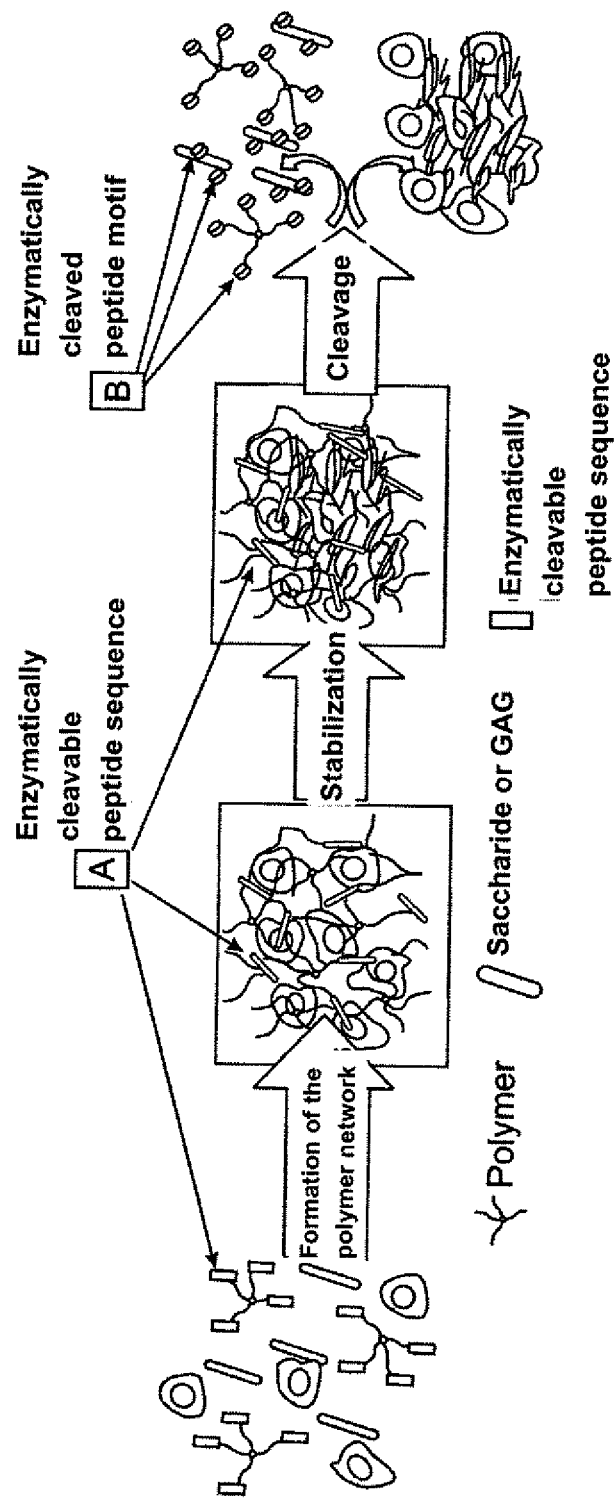

FIG. 6 illustrates in a schematic diagram the application of bio-orthogonal material degradation for cell and tissue production in three-dimensional applications. In this case, a polymer network is produced by mixing a star-shaped polymeric component having at its four ends a respective short cleavable peptide sequence, as well as a saccharide or a GAG. Several peptide sequences which are not linked to the same polymer molecule are bonded in the network (formation of a network) to each saccharide or GAG molecule. By adding cells during the generation of the network structure, the cells are physically integrated into the network structure. The three-dimensional network structure provides a stable framework for the cells, which is similar to the three-dimensional extracellular matrix. After successful production of the tissue, the tissue can be separated gently and selectively from the three-dimensional carrier material by the controlled enzymatic cleavage of the peptide sequences, wherein the three-dimensional network decomposes into star-shaped polymer molecules with terminal peptide motifs of the previously cleaved peptide sequence and saccharide or GAG molecules, also with attached peptide motifs of the cleaved peptide sequence.

This invention provides a new tool for researchers or medical personnel in the collection, storage and culturing of live cells, tissues, organs that are not available with other methods.

Figure 7A:
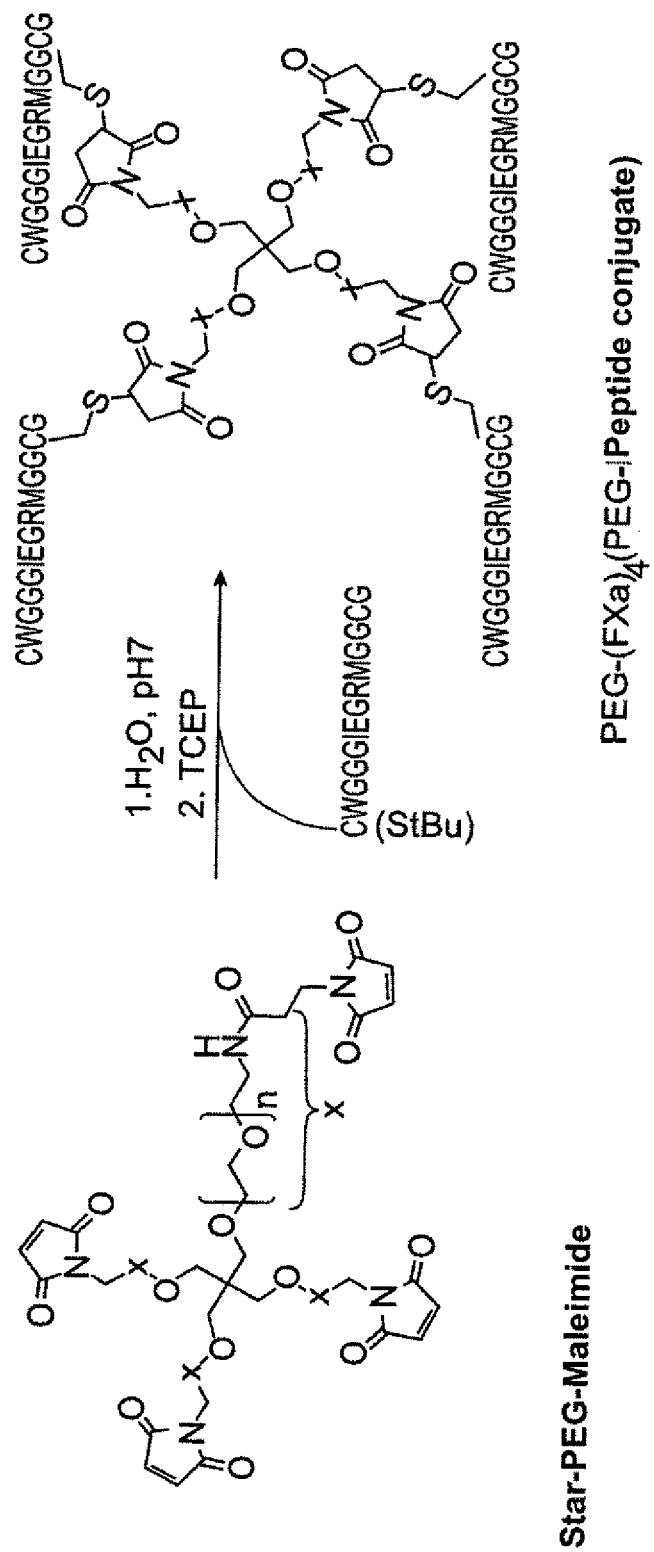
FIG. 7B an HPLC analysis of PEG (maleimide)$_4$.
FIG. 7C an HPLC analysis of a reaction mixture of PEG (maleimide)$_4$ with a cleavable peptide, FIGS. 8A-8B a schematic view of the hydrogel network formation by a Michael addition, FIG. 9 micrographs with an example of a long-term culture on FXa-degradable hydrogels, FIG. 10 light micrographs of the formation of layers of human corneal endothelial cells (HCEC) with simultaneous hydrogel degradation, FIG. 11A light micrographs of the formation of layers of human corneal endothelial cells (HCEC) with simultaneous hydrogel degradation, and FIG. 11B light micrographs of various examples of formed HCEC layers.

In the following, further exemplary embodiments will be described in detail:

A synthesis of PEG-(FXa)$_4$-conjugates was performed, as shown schematically in FIG. 7A. Synthesis of the PEG (FXa)$_4$ conjugates was performed as previously described in the publication Tsurkan M. V. et al. Defined polymer-peptide conjugates to form cell-instructive starPEG heparin matrices in situ. Adv. Mater. 25, 2606-2610 (2013). FXa peptide is to be understood as a peptide having a site that is cleavable by factor $X_a$ protease.

Figure 7B:
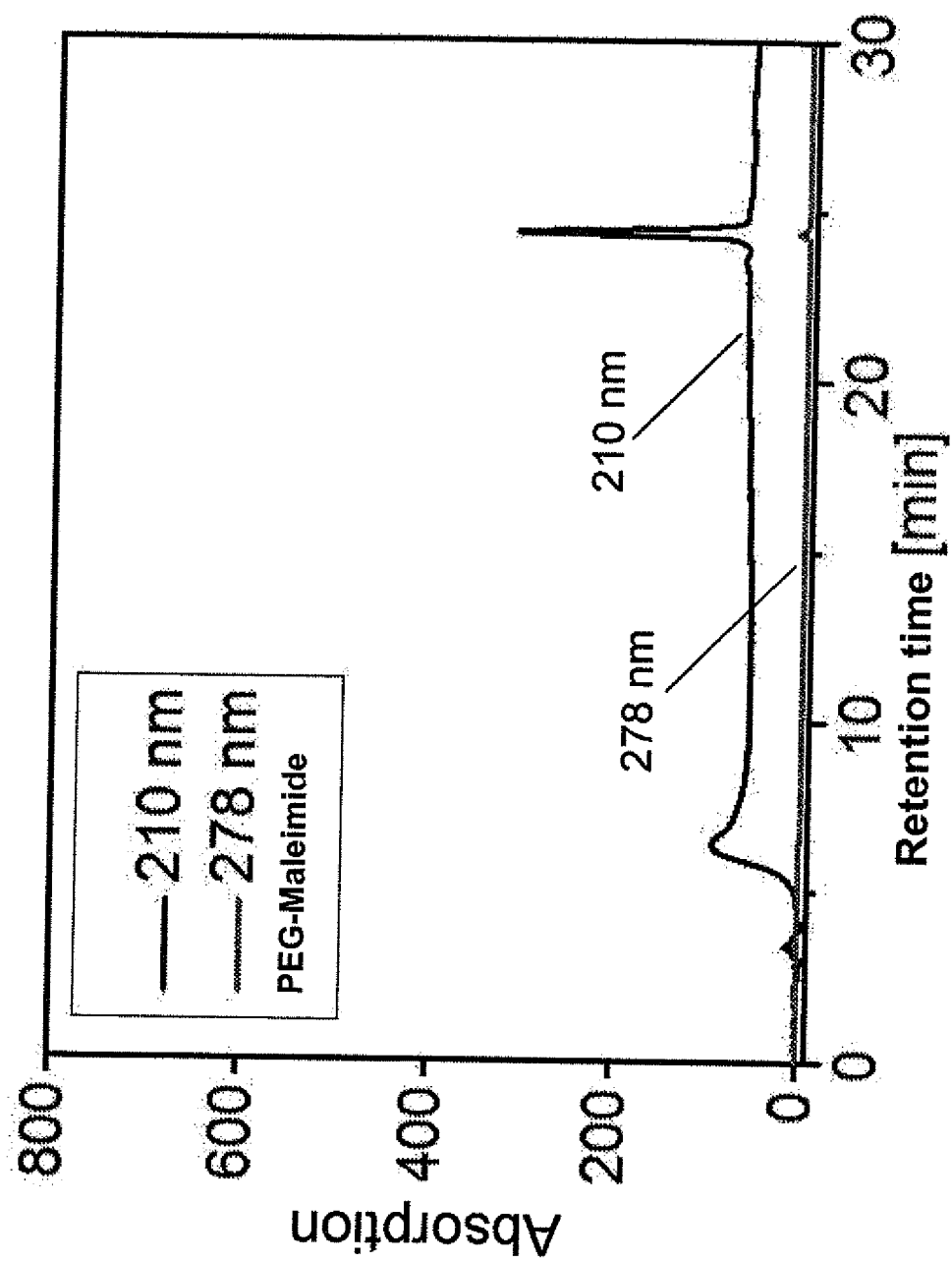
Figure 7C:
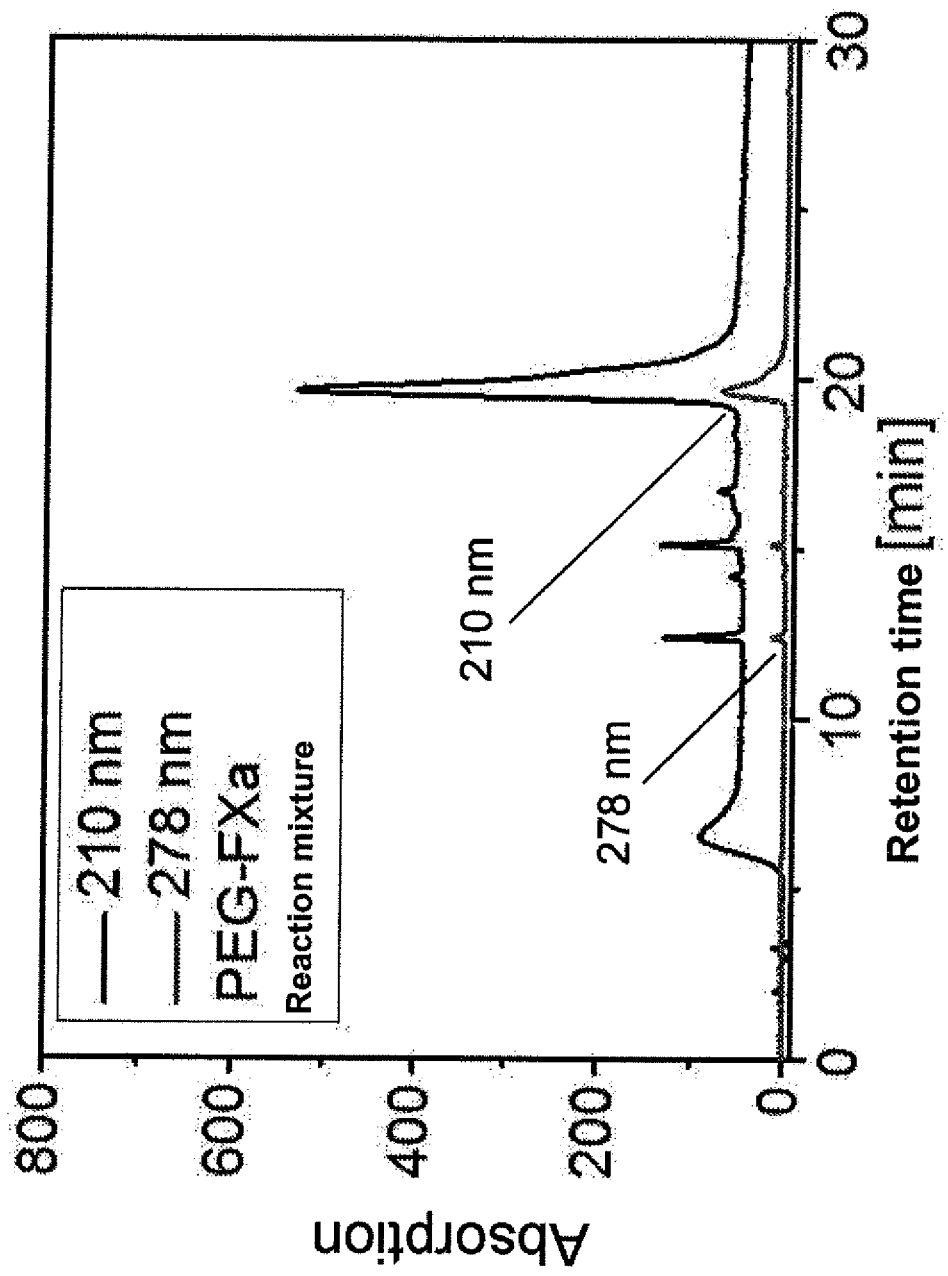

427 mg of PEG-maleimide were briefly dissolved in 10 ml of 50% (v/v) acetonitrile/water and mixed with 300 mg of the FXa peptide (30% excess), which was dissolved in 15 ml of 50% (v/v) acetonitrile/water. The pH of the reaction mixture was adjusted with 1 M NaOH to pH 7.5-8. The reaction was carried out for 5 hours under a nitrogen atmosphere and the completion of the reaction was monitored by analytical HPLC. The reaction mixture was purified by preparative HPLC. The product was collected from the HPLC and freeze-dried for more than 24 hours. The formed white powder was then stored at −20° C. The synthesis scheme and the HPLC monitoring of the reaction are illustrated in FIGS. 7A, 7B and 7C.

Figure 8A:
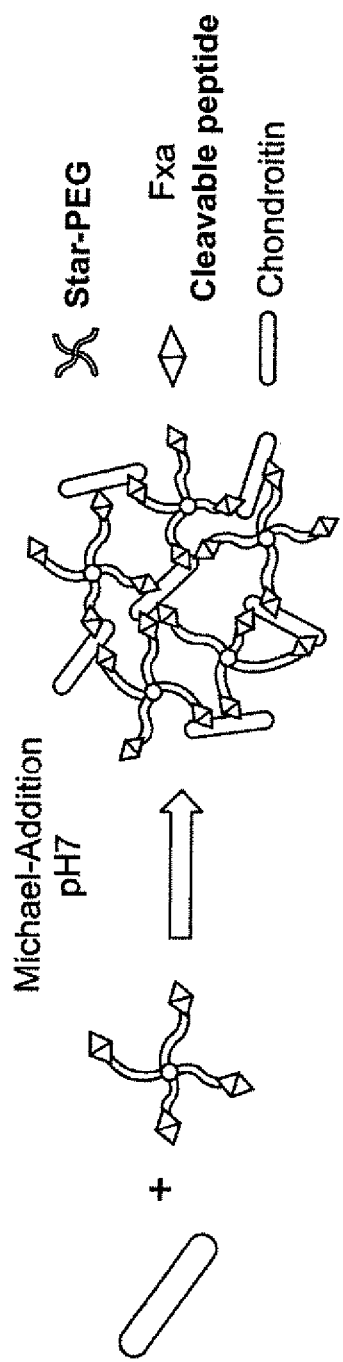
Figure 8B:
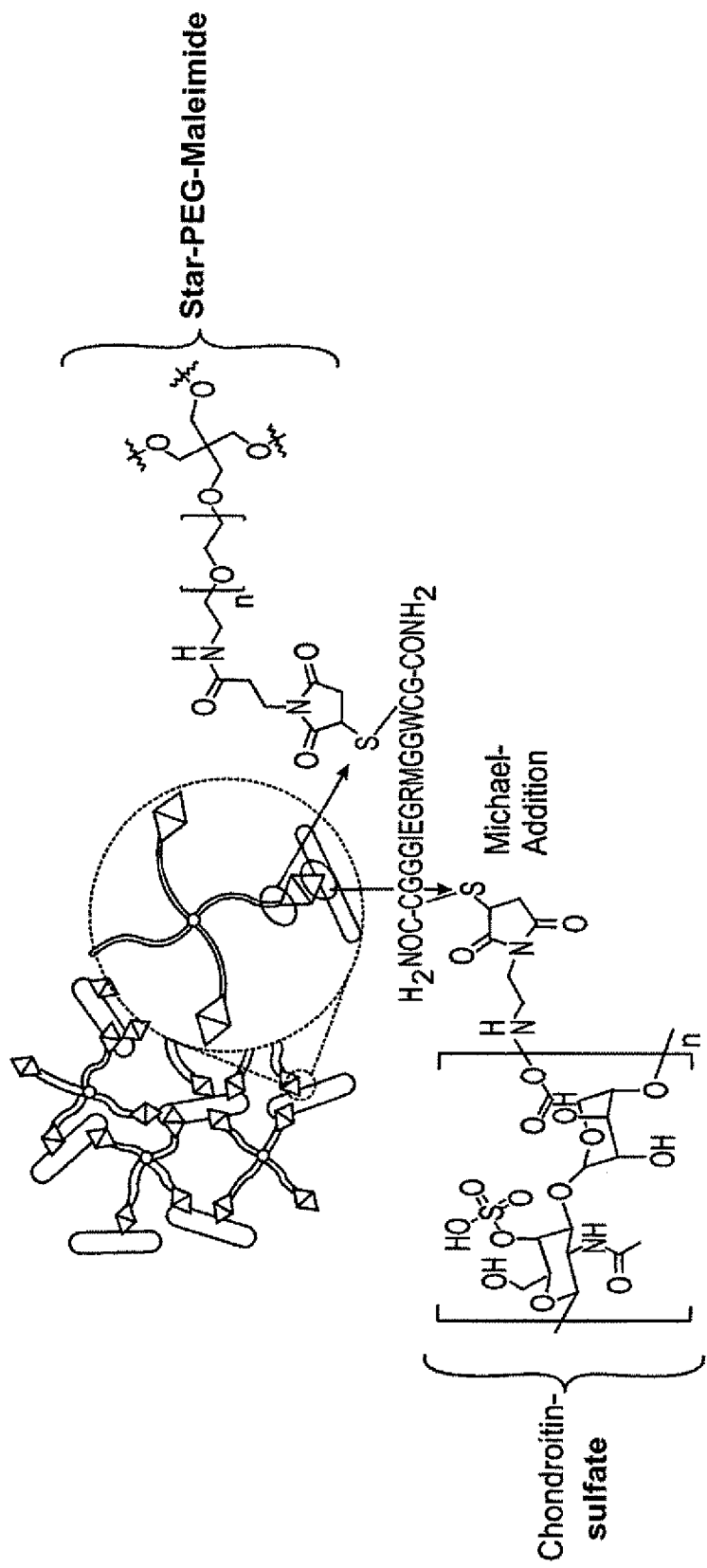

Hydrogel Formation:

The schematic diagram of the hydrogel formation and the mechanical properties as a function of the hydrogel crosslinking degree are shown in FIGS. 8A and 8B. The hydrogel network is formed by a Michael addition reaction through formation of peptide crosslinks (nodes). The total solids content of all gel mixtures was always kept at 5% (50 mg/ml), regardless of the degree of crosslinking (which corresponds to a molar ratio PEG/CSMal$_6$=c). A simple adjustment of the volume ratio of the PEG (FXa)$_4$ and CSMal$_6$ while maintaining a constant total volume, allows adjustment for the swelling and rigidity of the formed hydrogels. CS is here the abbreviation for chondroitin sulfate, Mal the abbreviation for maleimide.

Figure 9:
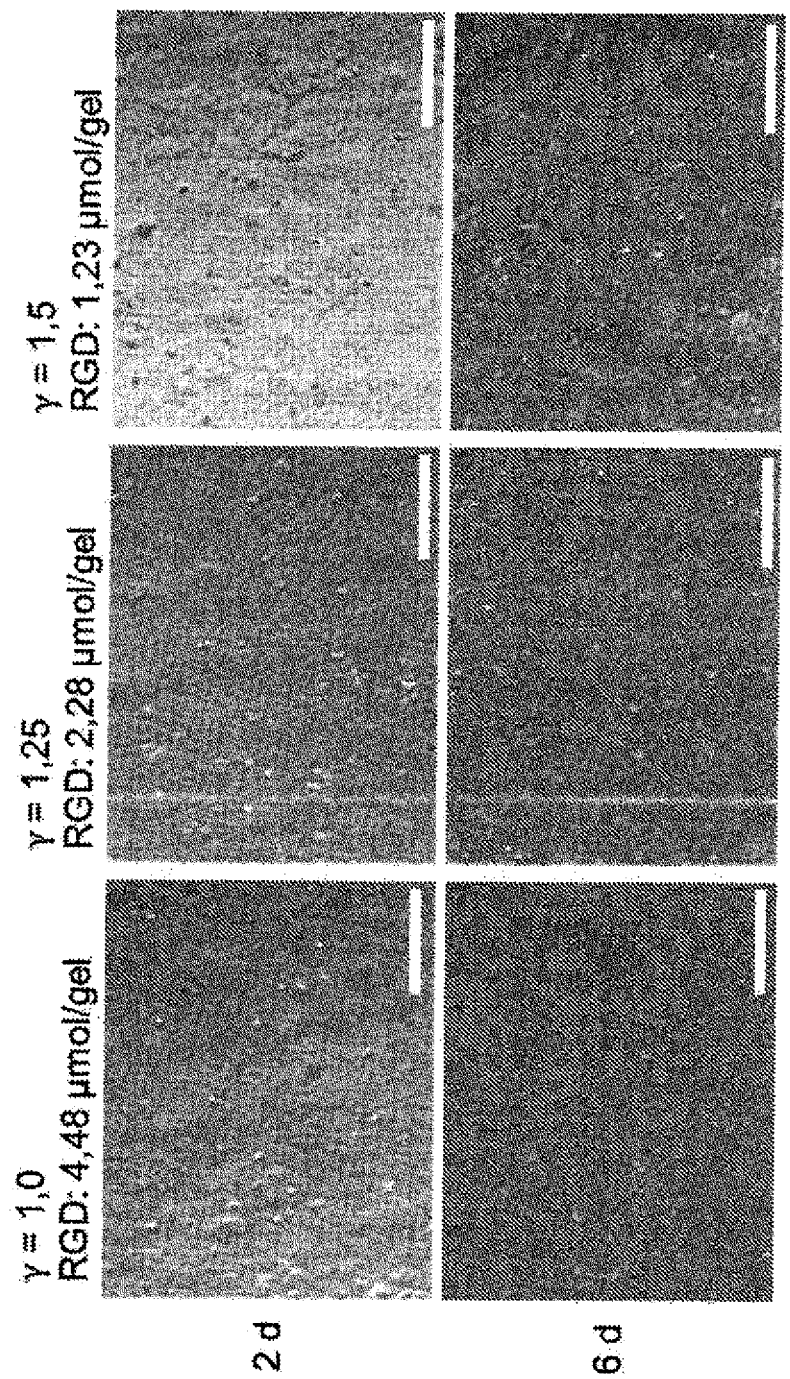

Formation of HCEC layers during hydrogel degradation: The immortalized human corneal endothelial cells of the (HCEC)-line HCEC-B4G12, as described in the published document Valtink M. et al. Two clonal cell lines of immortalized human corneal endothelial cells show either differentiated or precursor cell characteristics. Cells. Tissues. Organs 187, 286-94 (2008), was cultured in human endothelial SFM (SFM=serum-free corneal organ culture medium) supplemented with 10 ng/ml human recombinant basic fibroblast growth factor (bFGF). HCEC were seeded onto the FXa degradable hydrogels at a density of 1×10$^5$ cells per cm$^2$. The cells were kept at 37° C. in a humidified atmosphere containing 5% $CO_2$. The medium was changed three times a week. The hydrogel formation and the mechanical properties as a function of the hydrogel degree of crosslinking are shown in FIG. 9. FIG. 9 shows micrographs of the long-term HCEC culture on FXa degradable hydrogels. FXa-cleavable hydrogels of degree of crosslinking γ=1.25 were found to be suitable for the HCEC culturing procedure, since a nearly coalesced cell layer was formed after 48 hours (2d).

After seven days of culturing on the FXa-degradable hydrogels, the samples were incubated in human endothelial SFM w/900 nM factor Xa endoprotease for 45 min at 37° C. After this time, the cellular monolayers were completely released and could be carefully handled with a 20 gauge cannula (HSW Fine Ject, Tuttlingen, Germany). The light micrographs of the HCEC layer formation during the hydrogel degradation are shown in the supplementary FIGS. 10 and 11A.

Figure 10:
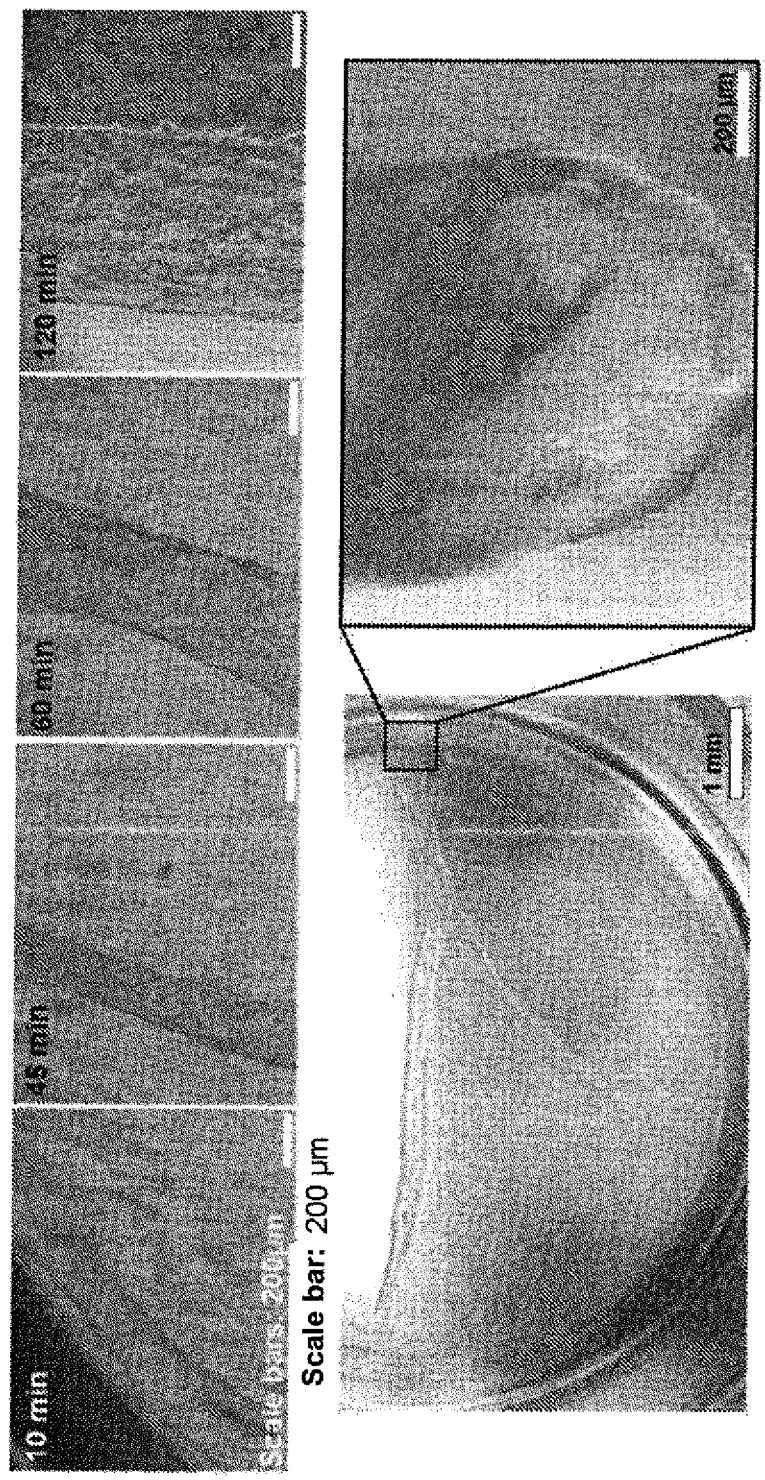

FIG. 10 shows by way of light micrographs the formation of HCEC layers during hydrogel degradation in human endothelial SFM w/450 nM factor Xa endoprotease at 37° C. A complete degradation could be observed after 120 min.

Figure 11A:
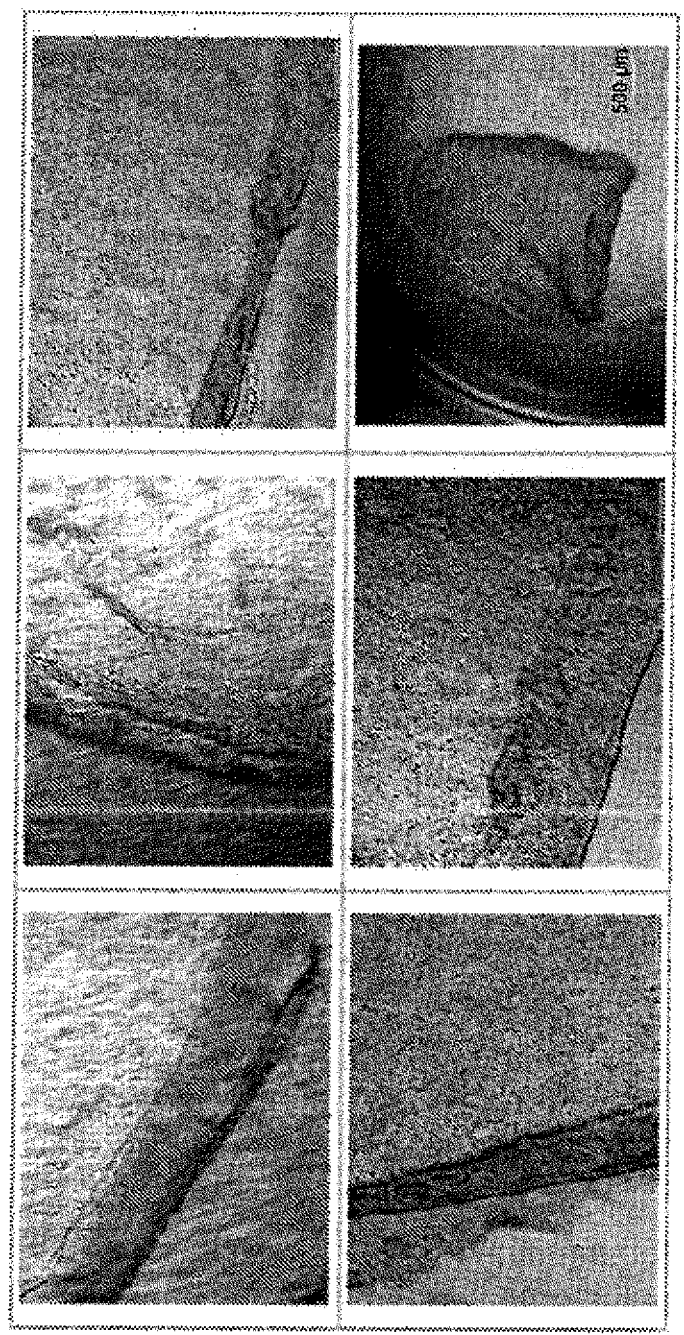

FIG. 11A shows by way of light micrographs the formation of HCEC layers during hydrogel degradation in human endothelial SFM w/900 nM factor Xa endoprotease at 37° C. by means of optical micrographs. A complete degradation took place after 45 min.

Figure 11B:

FIG. 11B shows various light micrographs of various examples of the formed HCEC layer.

What is claimed is:

1. A polymer-based material, comprising:

one or more covalently bonded peptide sequences having a site that is enzymatically cleavable by proteases, said site selected from the group consisting of: a site cleavable by tobacco etch virus protease, a site cleavable by human rhinovirus 3C protease, a site cleavable by factor $X_a$ protease, a site cleavable by enterokinase, a site cleavable by caspase-3 protease, a site cleavable by a fusion protein of glutathione-S-transferase (GST) and human rhinovirus (HRV) type 14-3C protease, each said peptide sequence consisting of between 2-15 amino acids is incorporated into a three-dimensional structure of the polymer-based material, a releasable bioactive component selected from the group consisting of active ingredients, nucleic acids, DNA, RNA and aptamers, proteins, peptide conjugates, sulfated and non-sulfated polysaccharides and conjugates thereof, said bioactive component physically embedded into said three-dimensional structure, said three-dimensional structure degradable on demand in a controlled bio-orthogonal degradation with an added non-cellular enzyme, such that the covalent bonds of the peptide sequence are degraded to release the bioactive component, wherein the protease-cleavable site is selected from the group consisting of SEQ ID NO: 1, SEQ ID NO: 9, SEQ ID NO: 2, SEQ ID NO: 5, SEQ ID NO: 10, SEQ ID NO: 11, SEQ ID NO: 3 and SEQ ID NO: 6.

2. The polymer-based material according to claim 1, wherein the polymer-based material is a hydrogel or a condensed polymer.

3. The polymer-based material according to claim 1, wherein the enzymatically degradable peptide sequences are not degradable by biological and metabolic activity of cells and tissues.

* * * * *